Feb. 10, 1970     P. NYROP     3,494,465
SELECTIVELY PERMEABLE MEMBRANE SEPARATION APPARATUS
Filed Sept. 16, 1968     4 Sheets-Sheet 1
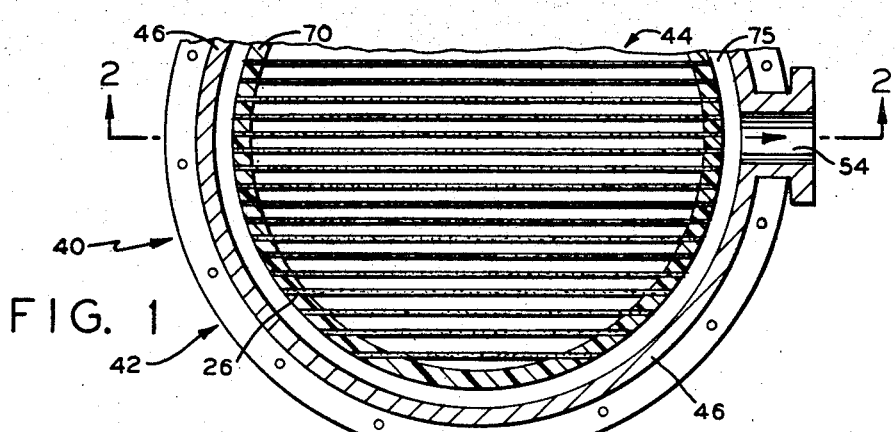
FIG. 1
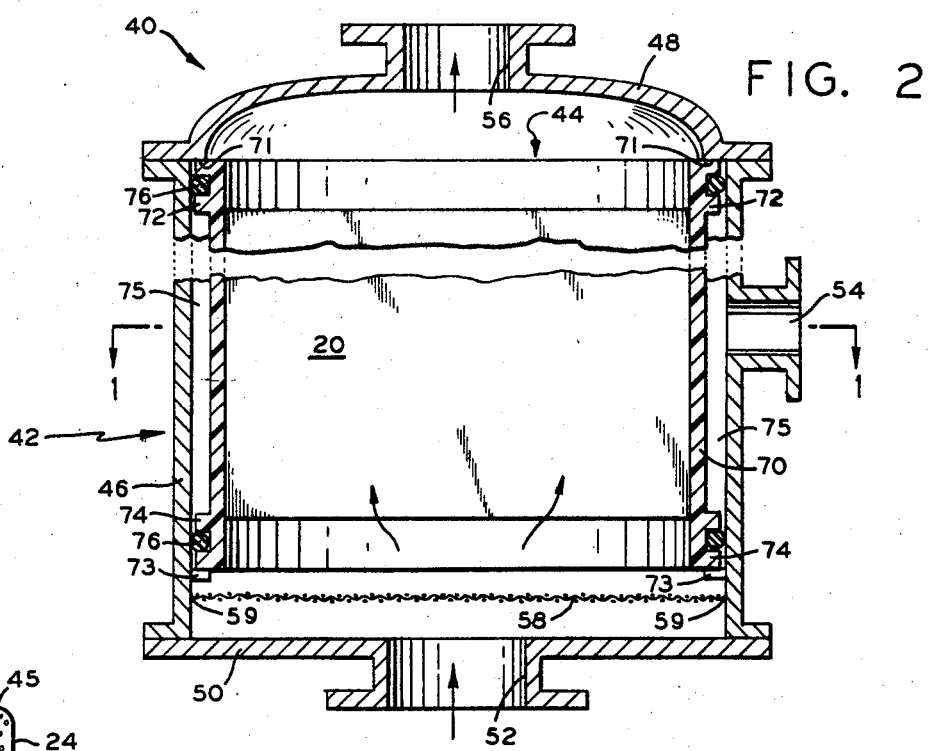
FIG. 2
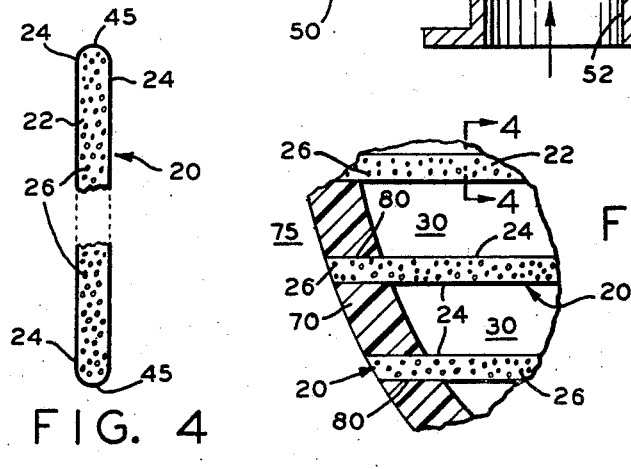
FIG. 4
FIG. 3
INVENTOR.
PER NYROP
BY
ATTORNEY

INVENTOR.
PER NYROP
ATTORNEY

INVENTOR.
PER NYROP

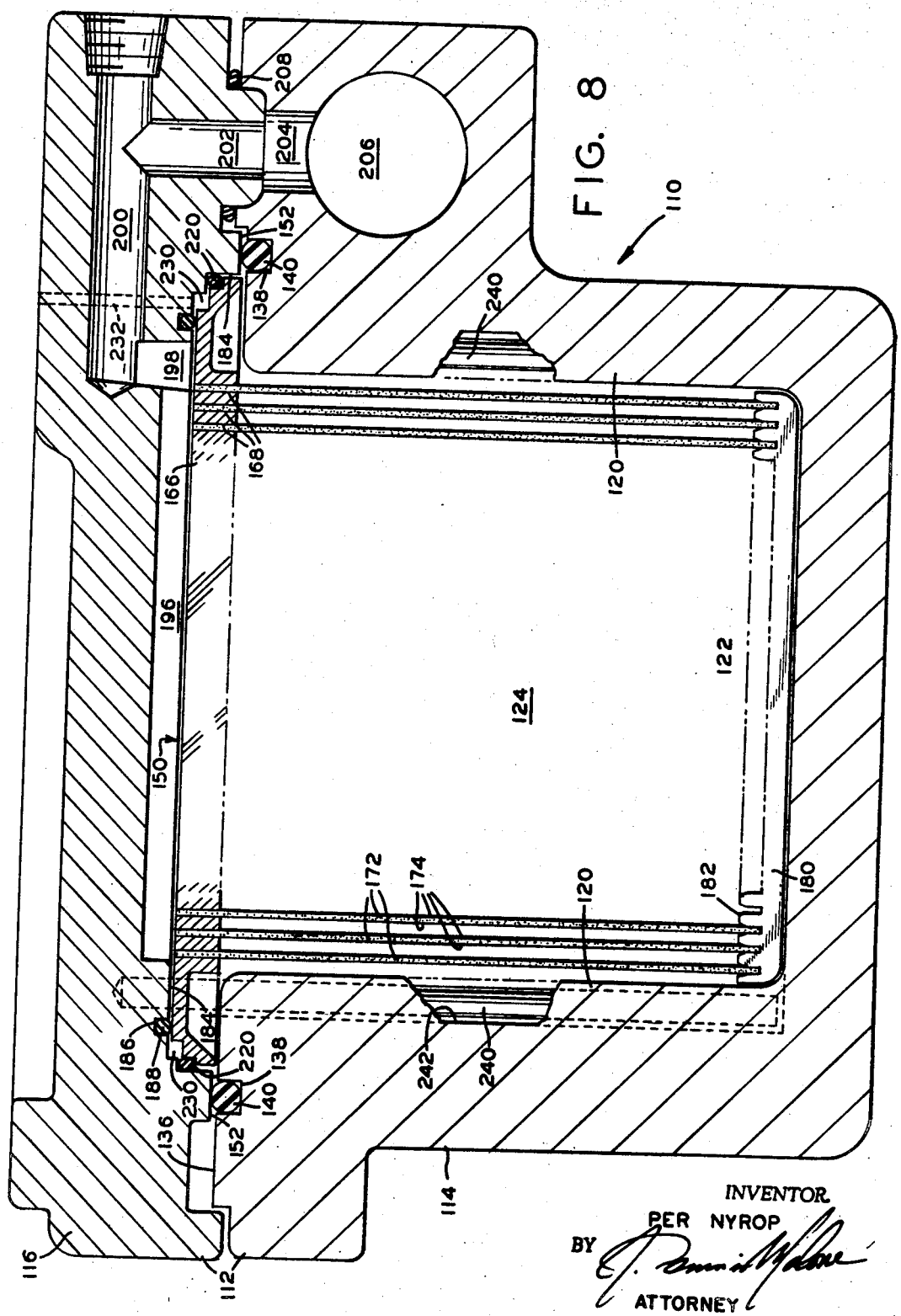

United States Patent Office 3,494,465
Patented Feb. 10, 1970

3,494,465
SELECTIVELY PERMEABLE MEMBRANE SEPARATION APPARATUS
Per Nyrop, Norwalk, Conn., assignor to Dorr-Oliver Incorporated, Stamford, Conn., a corporation of Delaware
Continuation-in-part of application Ser. No. 423,173, Jan. 4, 1965. This application Sept. 16, 1968, Ser. No. 760,041
Int. Cl. B01d *13/00*
U.S. Cl. 210—194                    20 Claims

ABSTRACT OF THE DISCLOSURE

A selectively permeable membrane separation apparatus adapted to accommodate high feed-to-effluent ratios, the apparatus providing a long straight unrestricted feed channel extending through a plurality of separation units, each separation unit presenting a plurality of membrane presentation laminates oriented parallel to the feed channel, the laminates having a central porous membrane-supporting lamina mounted and connected in the separation units to drain effluent along the plane of the support lamina in a direction transverse to the feed channel.

CROSS-REFERENCES TO RELATED APPLICATIONS

This application is a continuation-in-part of application Ser. No. 423,173 filed Jan. 4, 1965, now Patent 3,401,798.

SUMMARY OF THE INVENTION

A number of processes involving the treatment of slurries or liquids with selectively permeable separation membranes are conventional, inter alia, reverse osmosis and ultrafiltration. Further, a large class of selectively permeable membranes and the processes for making them are known. The class exemplarily includes, but is certainly not limited to, materials such as cellulose acetate, polyelectrolytes, and polymers. Most types of the known selectively permeable membranes can be produced with permeability characteristics appropriate for the requirements of a specific separation. However, as the details of the above-mentioned facets of the membrane-separation technology form no part of the present invention and are described elsewhere in the technical literature, they are not described in any further detail here.

The practical application of such known processes and materials to specific separation operations has been hampered by the structural and fabrication problems encountered in attempting to present large surface areas of the membrane to large quantities of a feed liquid at relatively high feed velocities without unduly increasing the cost, volumetric size, and pumping requirements of the separation equipment.

It is, therefore, a primary object of the present invention to provide unique, economical, improved separation units having high membrane surface areas per unit volume and adapted for high feed-to-effluent flow ratios.

To achieve this object, the present invention provides, inter alia, a novel and improved membrane support arrangement which carries the fluid pressure loads encountered during operation and drains away the effluent material separated from the feed without occupying a disproportionately large volume in the separation unit. For this purpose, it has been discovered that certain thin, inexpensive, generally flexible, sheet-like materials which are capable of internally conducting effluent can accomplish these purposes to advantage. Suitable materials exemplarily include resin treated paper, glass fiber mat, open foamed plastics, and sintered plastics. Membrane films are disposed on opposite sides of the support sheet or core lamina. A plurality of such membrane laminates are utilized in a separation unit so that the laminates are exposed to feed pressure on opposite sides and are thus only subjected to compressive loads. The fluid-conducting interstices in the support lamina serve to drain away effluent along the plane of the laminate. Suitable treatment of core lamina material can strengthen the interstructural bonds therein to the extent that the laminate has sufficient compressive strength, even when wet, to withstand the compressive pressures without suffering collapse of the interstices. The use of the above-mentioned flexible membrane support materials according to this invention greatly facilitates and reduces the cost of construction of separation units because the materials are easy to shape or cut and can be handled without breakage.

The novel membrane laminates of this invention are incorporated into a separation unit in an improved manner by assembling them into a layered stack with at least one edge of the laminates extending through an impermeable barrier or partition which separates the feed spaces between the laminates from an effluent space or chamber outside the partition and remote from the laminates. This arrangement permits drainage of effluent from the membrane support laminae through the partition and into the effluent space.

Further, a unique axial flow of the feed fluid is provided by a novel arrangement of elongated straight unrestricted feed conduits in which the laminates are disposed in parallel relation to the feed flow. The impermeable barrier or partition defines one side or one portion of the feed conduit thereby permitting the effluent to drain a relatively short distance in a direction transverse to the feed flow. By such arrangements circuitous or restricted feed paths of high flow resistance are avoided while at the same time short straight effluent drainage paths are provided.

These and other objects of the present invention will become more fully apparent from the following description and appended claims when read in conjunction with the accompanying drawings.

BRIEF DESCRIPTION OF THE DRAWINGS

FIGURE 1 is a fragmentary, transverse section of a membrane-separation unit according to the present invention.

FIGURE 2 is a longitudinal section of the separation unit of FIGURE 1 taken substantially on line 2—2.

FIGURE 3 is a fragmentary, enlarged transverse section of the laminate assembly of the separation unit of FIGURE 1.

FIGURE 4 is a longitudinal section of a laminate of the separation unit taken substantially on line 4—4 of FIGURE 3.

FIGURE 8 is a transverse section taken through one of the units of FIGURE 5.

DESCRIPTION OF THE INVENTION

Figure 9:
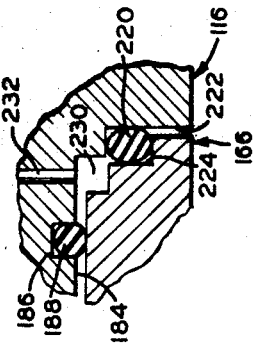
FIGURE 9 is an enlarged fragmentary section of a portion of FIGURE 8.
Figure 5:
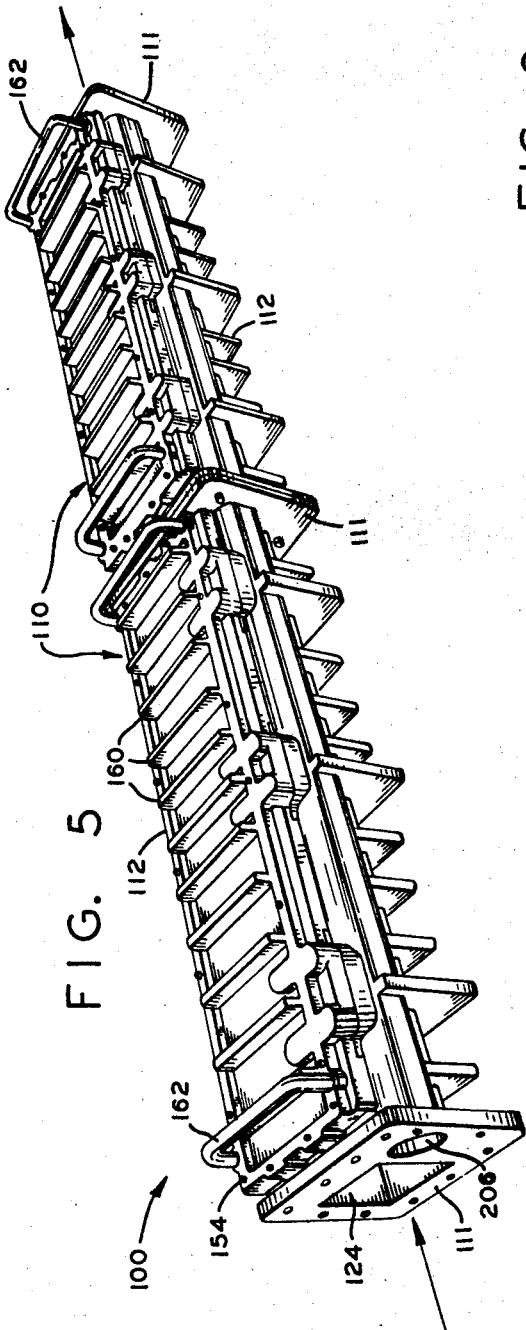
FIGURE 5 is a perspective view of an assembly of membrane separation units according to a further embodiment of the invention.

Referring to the drawings in detail, the embodiment shown in FIGURES 1 to 4 incorporates the basic membrane laminate 20 (FIGURES 3 and 4) of the present invention which permits the improved, low-cost, unique separation devices herein disclosed. Laminates 20 provide an economical presentation of large areas of membrane to feed spaces or conduits 30 which are external to the laminates and which receive the fluid to be separated from feed structures fully described below. To support the thin, weak membranes to withstand the pressure differential load during operation, laminates 20 have a fluid-conducting central support or core lamina 22 with selectively permeable membranes 24 disposed upon the opposite surfaces thereof. Interconnected spaces or interstices 26 in core lamina 22 are capable of conducting effluent away from the interior surfaces of membranes 24.

It should be noted that FIGURES 3 and 4 are merely schematic in that these do not show the interconnections between interstices 26 and in that they fail to show true proportional relationships between the interstitial spaces and the solid portions of the core. That is, suitable lamina materials provide interstitial spaces which will usually be proportionately larger than the solid matrix of the core.

Preferably the core lamina material is, at least in one stage, non-brittle and can be cut, machined, shaped, and configured easily. However, it is further necessary that the core lamina material have sufficient compressive strength when wet to support the membranes under operating pressure differentials without collapsing and closing off the effluent-conducting interstices. One suitable material is a resin-impregnated paper; however, other materials, such as resin bonded glass or plastic fiber matting, resin bonded granular solids, or an open foamed plastic having interconnected cells may be utilized.

In one specific example of the present invention, core lamina 22 is a phenolic-treated filter paper approximately $\frac{1}{32}$ inch thick which uncured is relatively flexible. This laminate can be cured by suitable treatment in order to form interfiber bonds within the paper to increase the compressive strength of the paper to withstand fluid pressures applied to the membranes during operation.

For ease in handling and assembling the laminates, the membranes 24 preferably cohere to the surfaces of core lamina 22. For example, the membrane may be cast directly on a core lamina which has been suitably prepared to prevent the membrane material from soaking into the core interstices. Cohesion will then take place between the surface matrix of the core lamina and the membrane.

By the structure and techniques discussed in relation to FIGURES 3 and 4, the invention achieves a unique, economical, and improved support for the thin and relatively weak membranes 24 to enable them to withstand the pressure differentials existing between the feed and effluent surfaces of the membrane during operation. Further, by the use of a flexible or non-brittle core materials, the invention provides an inexpensive support system for the membranes which is resistant to the thermal and mechanical shocks which may be encountered during assembly or operation of a separation unit.

As shown in FIGURES 1 to 4, membrane laminates 20 are incorporated in a novel separation unit 40 which includes a housing 42 and one or more membrane cartridges 44 which are preferably arranged so as to be removable from the housing for replacement purposes.

Housing 42 includes a generally cylindrical body 46, a closure or cap 48, and a base 50. Components 46, 48, and 50 of housing 42 are suitably secured together in sealed relationship as by flanges as indicated in the drawings. Housing 42 has a feed inlet 52 in base 50, an effluent outlet 54 positioned in housing body 46, and a concentrate outlet 56 located in housing cap 48. Housing 42 of the separation unit may further include a protective screen 58 in the housing by any suitable mounting 59 for the purpose of protecting the laminates of the cartridges from oversize particles in the feed.

Membrane cartridge 44 is made up of an assembly or stack of generally parallel laminates 20. As shown in FIGURE 4, the individual laminates 29 are closed at their axially disposed edges 45 as by a circumferential application of membranes 24 around these edges. However, edges 45 may also be closed by application of a sealant to such edges. The stack of laminates 20, which as shown has a generally circular cross-sectional configuration, is enclosed in an annular cartridge wall or shell 70.

Shell 70 is spaced from the interior surface of housing body 46 to define an annular effluent receiving chamber 75 therebetween. The shell is sealed with respect to the housing by cartridge flanges 72 and 74, each containing a suitable recess for respective O-rings 76. Cartridges 44 are removably mounted within housing 42 as by an abutting contact of cartridge flange 72 at one end of the housing with a shoulder 71 on housing cap 48 and by contact of cartridge flange 74 at the other end of the housing with stops 73 fixed on the interior of housing body 46.

As best shown in FIGURE 3, shell 70 of cartridge 44 is so formed in relation to transverse edges 80 of laminates 20 that it effectively seals off the inter-laminate feed conduits 30 from the effluent chamber 75 external to the cartridge shell. However, the porous central core laminae 22 are provided with open communications through shell 70 so as to provide flow conduits from the interstitial spaces within the laminates to the effluent space 75 external to the shell.

In FIGURES 5 to 10, the present invention is embodied in an elongated assembly 100 made up of a plurality of selectively permeable membrane separation units 110 which are adapted to be joined together in an end-to-end relationship by flanges 111 located at either end of each unit. The membrane separation units 110 include a housing 112 made up of a base 114 and a cover 116. Base 114 includes side walls 120 and a bottom wall 122 which together define a straight open-sided feed channel or passage 124 extending longitudinally from one end to the other of each unit. Base 114 of the housing has a plurality of strengthening ribs 130 to render the housing capable of withstanding the fluid pressures which exist within channel 124 during operation. Additional strengthening ribs 132 are dimensioned so as to function as supports for the unit.

In the vicinity of each end flange 111, base 114 has a bridge 134 across channel 124. Bridges 134 together with the exposed ends 136 of side walls 120 form a peripheral flange or face around the open side of channel 124. A groove 138 is located in this peripheral face to accommodate an O-ring 140 surrounding the side opening in feed channel 124. O-ring 124 is adapted to mate with and seal housing cover 116 when the housing is closed.

Covers 116 of membrane separation units 110 serve to close the open side of feed channel 124 and to mount membrane separation cartridges 150. For these purposes, covers 116 are provided with a peripheral face or boss 152 adapted to seat with O-ring 140 around the feed channel opening in base 114. Cover 116 is held in place on base 114 by suitable fasteners indicated schematically at 154 (FIGURE 5) which extend through holes 156 in the cover. Cover 116 has a plurality of strengthening ribs 160 and has handles 162 to facilitate removal of the cover.

Figure 7:
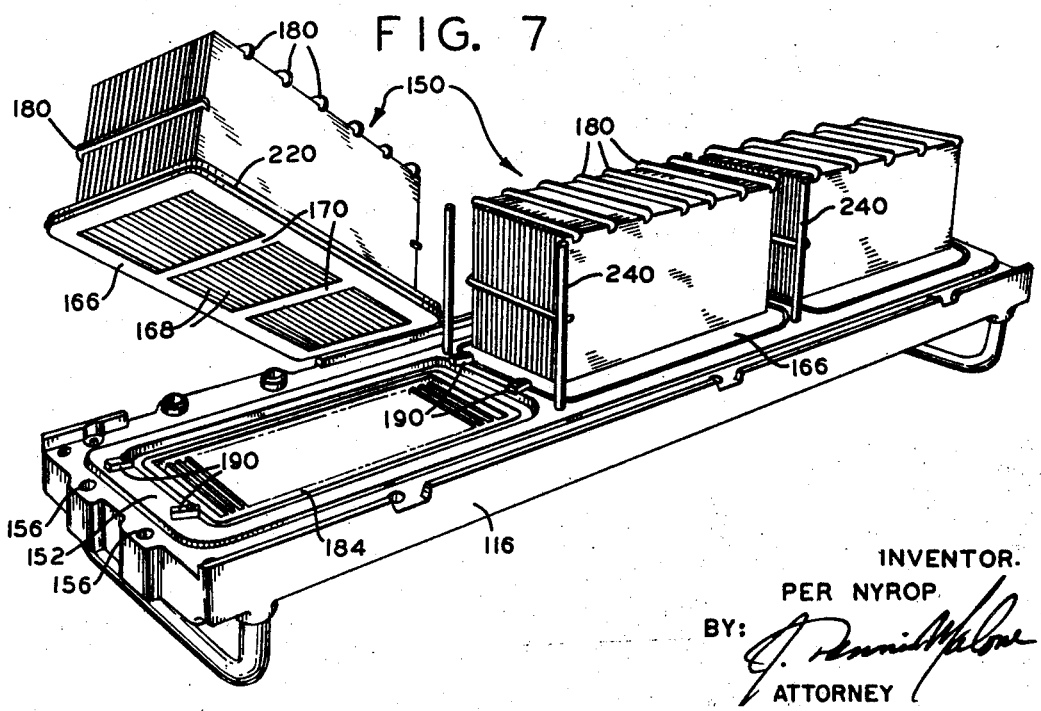
FIGURE 7 is a perspective exploded view of the housing cover and its associated membrane cartridges of one of the units of FIGURE 5.

Referring now particularly to FIGURES 7 and 8, the membrane-presentation cartridges 150 of the present invention have an impermeable barrier wall or cartridge header 166. Elongated orifices or slots 168 extend through barrier header 166 throughout the major portion of the length and width of the header. Slots 168 may be interrupted by strengthening cross bars 170 which are preferably integral with the header as a whole. Sheet-like membrane supports 172 are mounted in slots 168 and extend therefrom in parallel stacked relationship to substantially fill the cross-sectional area of feed channel 124, as seen in FIGURE 8. Membrane supports 172 are porous material having internally connected interstices which function to permit an effluent to flow within the porous support material along the plane thereof and through slots 168 in header 166. Membranes 174 are disposed on opposite surfaces of the sheet-like supports 172. The exposed edges of membrane supports 174 as well as their junction with the header 166 are sealed by appropriate techniques to ensure that no fluid communication between the feed channel and the effluent side of the header exists except through the selectively permeable membrane. Laminate combs 180 are located along the exposed edges of the laminates to hold the laminates in a fixed spaced-apart relationship in comb slots 182 so as to strengthen and rigidify the cantilevered laminates in the relatively turbulent feed flow in channel 124.

Cover 116 is adapted to mount and support a plurality of membrane cartridges 150 and to carry away effluent emerging from slots 168 in the cartridge headers during operation of the unit. For these purposes the cover embodiment herein disclosed includes a recess 184 to accommodate the header of each cartridge. Recess 184 is provided with a peripheral groove 186 containing therein an O-ring 188 (FIGURE 8). Cartridges 150 are retained in recesses 184 by latches 190. Additionally, during operation, the pressure differential between feed channel 124 and the effluent side of the cartridge header forces the header into recess 184 and sealingly compresses O-ring 188.

Drainage grooves 196 extend transversely across the bottom of recesses 184 in the cover to receive effluent discharging from the cartridge headers. A longitudinally extending trough 198 located at one side of each recess 184 serves to collect effluent from the array of drainage grooves 196. Passages 200 and 202 in the cover interconnect trough 198 with a passage 204 located in housing base 114. These passages serve to conduct effluent from the cartridge to a longitudinal effluent manifold 206 which extends through flanges 111 at either end of the unit to connect with the effluent manifolds of the adjacent units 110 in the assembly. The joint between cover passage 202 and the base passage 204 is sealed by an O-ring 208.

To safeguard against leakage of the feed material in channel 124 into the effluent spaces 186 and 198 in the cover a further O-ring 220 is mounted around the periphery of cartridge header 166. When the cartridge is installed in the cover, the O-ring is compressed between side wall 222 of recess 184 and side wall 224 of the cartridge header. Cartridge header 166 and cover recess 184 are suitably configured so as to define, when assembled, a peripheral channel 230 located between O-rings 186 and 220. This peripheral channel is connected to the exterior of the housing by weep holes 232. In operation O-ring 188 seals effluent from channel 230 and O-ring 220 seals feed material from channel 230. If either of the seals defined by O-rings 188 or 220 should be imperfect, the leakage fluid will discharge from the weep holes at the exterior of the unit and thus give visual warning of the problem.

Cover 116 has mounted therein guide bars 240 which align and mate with guide channels 242 located in base 114. These guide bars and grooves assist in assembling housing cover 116 and the cartridges carried thereon into the base of the unit housing. When the unit is assembled guide rods 240 are recessed into the side walls of channel 124 so that they do not interfere with the straight through flow of feed material therein.

Figure 10:
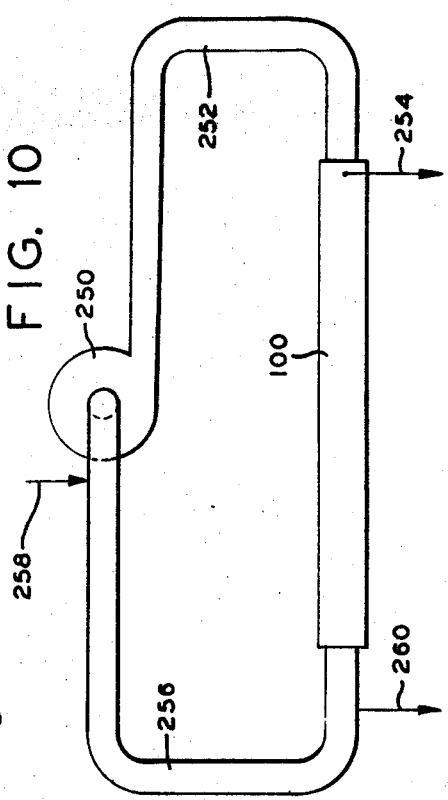
FIGURE 10 is a diagrammatic flowsheet showing a separation system utilizing a membrane separation assembly such as shown in FIGURE 5.
Figure 6:
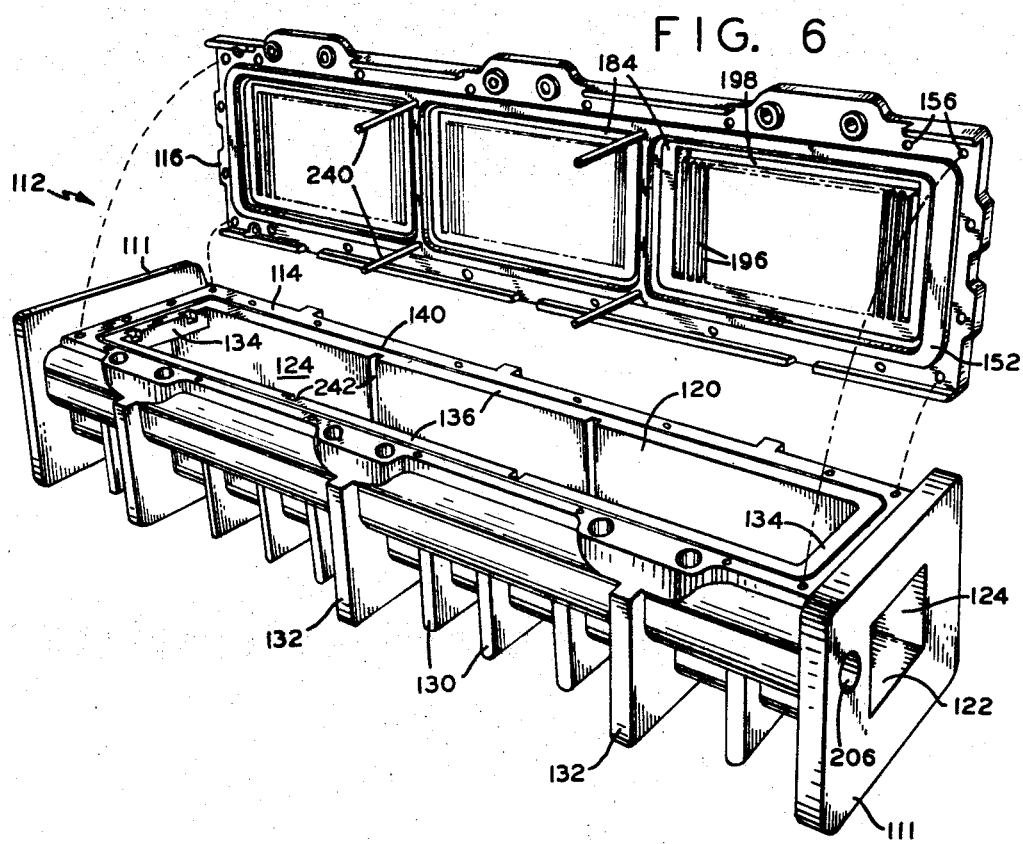
FIGURE 6 is a perspective exploded view of one of the membrane separation units of FIGURE 5 showing the housing cover removed from the base of unit.

In operation membrane separation assembly 100 is connected into a feed circuit capable of supplying feed material into feed channel 124 at relatively high velocities whereby a sufficiently high feed flow is established to maintain the ratio of feed to effluent flow in the range of 10 to 100. As shown in FIGURE 10, a feed circuit which recirculates the feed material repetitively through the elongated assembly 100 of units may be utilized. In such a system, a feed pump 250 circulates the feed material through a feed conduit 252 which has a cross-sectional area comparable to the available cross-sectional area of feed channel 124 of the membrane assembly 100. The proportionately small flow of effluent from assembly 100 is withdrawn from the effluent manifold thereof through conduit 254. The somewhat concentrated feed material discharging from assembly 100 is returned by a conduits 256 to pump 250. Replenishment feed material may be introduced continuously or intermittently into the system through a conduit 258. A bleed stream may be discharged intermittently or continuously from the system through a conduit 260, to maintain the concentration of the material in the recirculating feed stream below a desired value.

It should be noted that the separation units shown in FIGURES 1 to 4 and FIGURES 5 to 10 may be operated in any positional attitude. The illustrated orientations of the units are merely exemplary and in no way limit the teaching of the present invention.

Referring to the operation of the embodiment of FIGURES 1 to 4, a feed slurry or fluid is introduced through feed inlet 52 and passes through screen 58 into the membrane cartridges 44 in the unit. The feed material passes upwardly through inter-laminate spaces 30 between opposed membrane surfaces 24 on adjacent laminates 20. As a fluid pressure differential exists between inter-laminate spaces 30 and interstitial spaces 26 within the core laminae, a separation of the selected constituents of the feed slurry will take place. That is, the fluid with or without dissolved constituents of the feed will penetrate selectively permeable membrane 24 and pass into interstitial spaces 26. The material rejected by the membranes remains in the conduits 30 and is carried along to the discharge end thereof by the fluid flow through the unit. This reject material or concentrate is discharged from separation unit 40 through concentrate outlet 56.

The effluent which penetrates membranes 24, passes along the plane of core lamina 22 through the interconnected interstices thereof to discharge into effluent chamber 75 through the open laminate ends 80 where the laminates terminate in cartridge shell 70. The effluent from chamber 75 discharges from the separation unit through outlets 54 adjoining the effluent chambers 75 of the respective cartridges.

By means of the structure described above, the practical utilization of membrane separation equipment with high feed velocities and high feed flows in relation to effluent flows is accomplished. For example, in specific reference to the embodiment of FIGURES 5 to 10, the feed-to-effluent ratio per foot of length of feed channel can be practically maintained at values greater than 100 to 1. The use of high feed flows and velocities permitted by the present invention results in several operational advantages. The turbulence associated with the higher velocities is beneficial in preventing fouling and/or plugging of the membrane surfaces. Further, the higher velocities and resultant turbulence reduces boundary layer concentrations which interfere with the efficiency of the membranes. These advantages accrue from the structural features specifically pointed out in the claims below.

The invention may be embodied in other specific forms without departing from the spirit or essential characteristics thereof. The present embodiments are therefore to be considered in all respects as illustrative and not restrictive.

I claim:

1. Membrane separation apparatus for separating the constituents of a feed material comprising:
   (a) a plurality of spaced-apart parallel laminates each having a central, fluid-conducting support lamina together with selectively permeable membranes disposed on the respective surfaces of said support lamina to define separation boundaries between said fluid-conducting support lamina and feed spaces between said laminates, said laminates having at least one set of mutually adjacent terminal edges;

(b) a partition sealingly disposed across said terminal edges of the laminates to define an effluent space remote from said laminates, said fluid conducting laminae extending through said partition to communicate with said effluent space;

(c) and means defining an elongated closed conduit for circulating the material to be separated through the spaces between said laminates in a direction parallel to the plane of the laminates and parallel to the partition.

2. A separation unit comprising:
(a) a housing having a feed inlet, an effluent outlet, and a feed outlet;
(b) stacks of spaced-apart membrane laminates within said housing, each laminate having a fluid-conducting core and selectively permeable membranes disposed on the surfaces of said core;
(c) partition means disposed on at least one side of each laminate stack to close off the spaces between said laminates and to define with said housing a closed, effluent-outlet-connected chamber remote from said inlet and said feed outlet, said partition means having a plurality of open communications extending therethrough to connect said fluid-conducting laminate cores with said effluent chamber;
(d) said housing defining an elongated feed channel extending parallel to the membrane laminates and parallel to the partition means.

3. A separation unit as defined in claim 2, said feed inlet and outlet having substantially the same cross-sectional flow area as said feed channel, whereby a plurality of separation units may be connected in series with a continuous unrestricted feed conduit therethrough.

4. A separation unit as defined in claim 2, said stacks of laminates having a cross sectional configuration which matches and substantially fills the cross sectional area of the feed channel.

5. A membrane separation unit for separating the constituents of a feed material comprising:
(a) an elongated housing having a feed inlet at one axial end, a feed outlet at the other axial end, and an effluent outlet;
(b) a stack of parallel spaced-apart laminates disposed within said housing, each laminate having a central fluid-conducting support lamina together with selectively permeable membranes disposed on the surfaces of said lamina to define separation boundaries between said fluid-conducting support lamina and the spaces between said laminates, said laminates extending longitudinally with respect to said elongated housing;
(c) and a partition sealingly disposed between the terminal edges of adjacent laminates along at least one side of the laminate stack, said partition being spaced internally of said housing to define an effluent chamber with said housing effluent outlet, said fluid-conducting support laminae extending through said partition to communicate with said effluent chamber;
(d) said housing defining a long straight feed channel closely surrounding the laminate stack within the housing, the laminates of the stack being oriented parallel to the feed channel.

6. A membrane separation unit as defined in claim 5, said elongated housing having transverse flanges at either end, the flange at one end having the feed inlet located therein in substantial longitudinal alignment with the feed channel of the unit, the flange at the other end having the feed outlet located therein in substantial longitudinal alignment with the feed channel, said flanges being adapted to connect to the flanges of like units so as to align the feed channels of adjacent units to form a straight conduit.

7. A membrane separation cartridge for use in a separation unit having a housing with an effluent outlet, and with a feed inlet aligned with a feed outlet, said cartridge comprising:
(a) a plurality of spaced-apart laminates each having a central, fluid-conducting support lamina together with selectively-permeable membranes disposed on the respective surfaces of said support lamina to define separation boundaries between said fluid-conducting support lamina and feed spaces between said laminates, said laminates having at least one set of mutually adjacent terminal edges; and
(b) a partition sealingly disposed across said terminal edges of the laminates to separate said feed spaces between the laminates on one side of the partition from an effluent space on the other side of the partition, said fluid-conducting laminae extending through said partition to communicate with said effluent space, said cartridge being adapted when in use in the separation unit to present said interlaminate feed spaces in straight through alignment with the feed inlet and feed outlet and to communicate said effluent space with the effluent outlet.

8. A cartridge as defined in claim 7, said plurality of laminates being configured as a cylindrically-shaped stack of axially extending laminates and said partition circumferentially encompassing said laminate stack.

9. A membrane separation cartridge as defined in claim 7, said laminates having at least one other set of mutually adjacent edges located in said feed channel, said cartridge including at least one comb-like member extending transversely to the laminates with the teeth thereof positioned between the laminates, whereby the plurality of laminates are maintained in spaced relation in turbulent flow conditions in the feed channel.

10. A method of making the membrane separation cartridges as defined in claim 7 characterized by the step of assembling the laminates and the partition by inserting the support laminae into a plurality of parallel preformed slots in the partition.

11. A membrane separation cartridge as defined in claim 7, said partition having a plurality of preformed parallel slots through which said fluid-conducting support laminae extend.

12. A separation unit comprising:
(a) a housing having a feed inlet and outlet and an effluent outlet;
(b) a stack of spaced-apart membrane laminates within said housing each having a fluid-conducting core and selectively permeable membranes disposed on the surfaces of said core;
(c) partition means disposed on at least one side of said laminate stack to close off the spaces between said laminates and to define with said housing a closed, effluent-outlet-connected chamber remote from said inlet and said concentrate outlet, said partition means having a plurality of open communications extending therethrough to connect said fluid-conducting laminate cores with said effluent chamber;
(d) said housing defining a feed channel aligned with said feed inlet and outlet and oriented parallel to the membrane laminates whereby the interlaminate spaces are aligned with the feed flow in the channel;
(e) said partition means defining a side portion of said channel whereby effluent permeating the membranes flows through the fluid-conducting core in a direction transverse to the feed channel.

13. A separation unit as defined in claim 12, said feed channel being narrow relative to its length whereby the length of the transverse effluent flow path in the laminate core is minimized.

14. A separation unit as defined in claim 12, said housing comprising a base defining an open-sided feed channel and a housing cover having an effluent passage therein, said cover being adapted to mount the partition and stack of laminates with the effluent side of the partition adjacent the cover in communication with said effluent passage, said cover being removably mounted on the open-sided housing base so as to position the membrane stack in the feed channel and to close the open side thereof with said partition.

15. A separation unit as defined in claim 14, said housing base having an effluent manifold therein, said effluent passage in said cover interconnecting the effluent side of said partition with the effluent manifold in the housing base when the cover is in place, and an effluent discharge means connected to the base manifold, whereby the connection of the effluent discharge means to the unit is not disturbed by removal of the cover and the laminates mounted thereon.

16. A separation unit as defined in claim 14, said effluent passage in said cover including an array of effluent-collecting grooves and partition-supporting ridges therebetween, said partition being mounted on the cover in abutting relation to the partition supporting ridges.

17. A separation unit as defined in claim 14, including a sealing means between said cover and the partition mounted thereon, said sealing means including two resilient peripheral seals encompassing the laminate-opening area of the partition and a peripheral drainage groove between the seals, the cover having weep holes therein to bleed any leakage fluid from said groove to the exterior of the unit.

18. A separation unit as defined in claim 14, said cover having guide bars mounted therein, said base having corresponding guide recesses extending transversely to the plane of the open side of the feed channel, said guide bars and recesses cooperating to align the cover and membrane laminates mounted thereon with the housing base and feed channel during assembly of the unit.

19. A membrane separation system comprising, a membrane separation unit as defined in claim 12, a feed supply conduit connected to the feed inlet of the unit, a feed discharge conduit connected to the feed outlet of the unit, a pump connected between said discharge and said feed conduits for recirculating feed fluid through the unit.

20. A membrane separation system as defined in claim 19, said feed and said discharge conduits having a cross sectional area substantially equal to the available cross sectional flow area of the feed channel with the laminates therein.

References Cited

UNITED STATES PATENTS

| | | | |
|---|---|---|---|
| 2,208,135 | 7/1940 | McCormick et al. | 210—323 |
| 2,597,907 | 5/1952 | Steiner et al. | 55—158 |
| 2,958,391 | 11/1960 | De Rosset | 55—16 |
| 3,332,216 | 7/1967 | Stern | 55—158 |
| 3,398,833 | 8/1968 | Marks et al. | 210—321 |
| 3,401,798 | 9/1968 | Nyrop | 210—321 |

REUBEN FRIEDMAN, Primary Examiner

F. A. SPEAR, JR., Assistant Examiner

U.S. Cl. X.R.

55—158; 210—236, 321, 346, 433, 486, 490